US009454157B1

(12) United States Patent
Hafeez et al.

(10) Patent No.: US 9,454,157 B1
(45) Date of Patent: Sep. 27, 2016

(54) SYSTEM AND METHOD FOR CONTROLLING FLIGHT OPERATIONS OF AN UNMANNED AERIAL VEHICLE

(71) Applicants: Usman Hafeez, Chicago, IL (US); David Mauer, Chicago, IL (US)

(72) Inventors: Usman Hafeez, Chicago, IL (US); David Mauer, Chicago, IL (US)

(*) Notice: Subject to any disclaimer, the term of this patent is extended or adjusted under 35 U.S.C. 154(b) by 0 days.

(21) Appl. No.: 14/616,663

(22) Filed: Feb. 7, 2015

(51) Int. Cl.
G05D 1/00 (2006.01)
G05D 1/10 (2006.01)
G08G 5/00 (2006.01)

(52) U.S. Cl.
CPC ............ *G05D 1/104* (2013.01); *G08G 5/0069* (2013.01); *B64C 2201/126* (2013.01); *B64C 2201/128* (2013.01)

(58) Field of Classification Search
CPC ............... G05D 1/104; G08G 5/0069; B64C 2201/128; B64C 2201/126
See application file for complete search history.

(56) References Cited

U.S. PATENT DOCUMENTS

| | | | |
|---|---|---|---|
| 5,240,207 A | 8/1993 | Eiband et al. | |
| 5,317,320 A | 5/1994 | Grover et al. | |
| 5,521,817 A | 5/1996 | Burdoin et al. | |
| 5,862,401 A | 1/1999 | Barclay, Jr. | |
| 6,735,630 B1 | 5/2004 | Gelvin et al. | |
| 6,826,607 B1 | 11/2004 | Gelvin et al. | |
| 6,859,831 B1 | 2/2005 | Gelvin et al. | |
| 7,020,701 B1 | 3/2006 | Gelvin et al. | |
| 7,143,087 B2 | 11/2006 | Fairweather | |
| 7,685,083 B2 | 3/2010 | Fairweather | |
| 7,797,367 B1 | 9/2010 | Gelvin et al. | |
| 7,844,687 B1 | 11/2010 | Gelvin et al. | |
| 7,860,680 B2 | 12/2010 | Arms et al. | |
| 8,103,398 B2 | 1/2012 | Duggan et al. | |
| 8,140,658 B1 | 3/2012 | Gelvin et al. | |
| 8,290,706 B2 | 10/2012 | Tsutsui | |

(Continued)

FOREIGN PATENT DOCUMENTS

WO WO2014047720 A1 4/2014
WO WO2014064431 A2 5/2014

OTHER PUBLICATIONS

Abstract CN103197683 "Method for intelligently controlling flight heights and attitudes of quad-rotor unmanned helicopters." Available at https://www.google.com/patents/CN103197683A.

(Continued)

*Primary Examiner* — Khoi Tran
*Assistant Examiner* — Ryan Rink
(74) *Attorney, Agent, or Firm* — Kevin Keener; Keener and Associates P.C.

(57) ABSTRACT

The invention is directed toward a system and method for assigning mission directives to one or more unmanned vehicles and transferring mission directives from one unmanned aerial vehicle to a second unmanned aerial vehicle. The method comprises providing a set of instructions to a first unmanned aerial vehicle, storing the set of instructions on a nonvolatile memory component of the first unmanned aerial vehicle, executing one or more tasks of the set of instructions by the first unmanned aerial vehicle, transferring a set of instructions comprising unexecuted tasks from the first unmanned aerial vehicle to a second unmanned aerial vehicle, and storing the set of instructions on a nonvolatile memory component of the second unmanned aerial vehicle. The invention is further directed toward a method of determining a flight path for one or more unmanned aerial vehicles stationed at charging stations.

11 Claims, 6 Drawing Sheets

(56) References Cited

U.S. PATENT DOCUMENTS

| | | | |
|---|---|---|---|
| 8,352,097 B2 | 1/2013 | Crumm et al. | |
| 8,515,609 B2 | 8/2013 | McAndrew et al. | |
| 8,552,597 B2 | 10/2013 | Song et al. | |
| 8,643,719 B2* | 2/2014 | Vian et al. | 348/144 |
| 8,676,406 B2 | 3/2014 | Coffman et al. | |
| 8,832,244 B2 | 9/2014 | Gelvin et al. | |
| 8,899,903 B1* | 12/2014 | Saad et al. | 414/392 |
| 8,914,182 B2* | 12/2014 | Casado et al. | 701/24 |
| 2008/0039705 A1 | 2/2008 | Viswanathan | |
| 2008/0195729 A1 | 8/2008 | Chand et al. | |
| 2010/0224732 A1 | 9/2010 | Olson et al. | |
| 2010/0286859 A1 | 11/2010 | Feigh et al. | |
| 2011/0029804 A1* | 2/2011 | Hadden et al. | 714/1 |
| 2011/0093139 A1 | 4/2011 | Arms et al. | |
| 2012/0143482 A1 | 6/2012 | Goossen et al. | |
| 2012/0199698 A1 | 8/2012 | Thomasson et al. | |
| 2013/0012231 A1 | 1/2013 | Hall | |
| 2013/0128050 A1 | 5/2013 | Aghdasi et al. | |
| 2013/0260783 A1 | 10/2013 | Agrawal et al. | |
| 2013/0320212 A1 | 12/2013 | Valentino et al. | |
| 2013/0325212 A1 | 12/2013 | Wickman | |
| 2013/0345920 A1 | 12/2013 | Duggan et al. | |
| 2014/0025228 A1* | 1/2014 | Jang | G06Q 10/047 701/2 |
| 2014/0033058 A1 | 1/2014 | Perotti | |
| 2014/0067162 A1 | 3/2014 | Paulsen et al. | |
| 2014/0163852 A1 | 6/2014 | Borri et al. | |
| 2014/0166816 A1* | 6/2014 | Levien et al. | 244/175 |
| 2014/0166817 A1* | 6/2014 | Levien et al. | 244/190 |
| 2014/0172193 A1* | 6/2014 | Levien et al. | 701/2 |
| 2014/0172194 A1* | 6/2014 | Levien et al. | 701/2 |
| 2014/0222248 A1* | 8/2014 | Levien et al. | 701/2 |
| 2014/0316614 A1 | 10/2014 | Newman | |
| 2014/0316616 A1* | 10/2014 | Kugelmass | G05D 1/101 701/8 |
| 2015/0066253 A1* | 3/2015 | Hayes | 701/3 |
| 2015/0336669 A1* | 11/2015 | Kantor | G08G 1/00 701/3 |
| 2016/0046374 A1* | 2/2016 | Kugelmass | G05D 1/101 701/8 |

OTHER PUBLICATIONS

Abstract CN102566580 "Unmanned helicopter flight track planning method" Available at https://www.google.com/patents/CN102566580A.

Abstract CN202679644 "Wireless system of unmanned aerial vehicle based on 3G and WIFI." Available at https://www.google.com/patents/CN202679644U.

Abstract CN202713632 "Unmanned aerial vehicle multichannel wireless link system based on WIFI." Available at https://www.google.com/patents/CN202713632U.

\* cited by examiner

SYSTEM AND METHOD FOR CONTROLLING FLIGHT OPERATIONS OF AN UNMANNED AERIAL VEHICLE

FIELD OF INVENTION

The invention pertains generally to unmanned aerial vehicles and more particularly to a system and method for controlling and transmitting missions between multiple unmanned aerial vehicles.

BACKGROUND OF INVENTION

The use of Unmanned Aerial Vehicles (UAVs), otherwise known as drones, is a growing market and their use for multiple purposes is expected to grow exponentially within the next few years. UAVs can be used for any number of purposes. UAVs can fly over parts of land to give aerial views of land for planning purposes.

Currently, autonomous UAVs are given a mission directive. The mission directive may be any set of instructions to be fully executed by the UAV. As one example, an autonomous UAV may be given a flight path and a set of tasks to perform while flying on the flight path. The tasks may be any type of task, such as photographing a specific landscape or delivering a package. The UAV executes the mission directive by flying along the flight path and by executing all assigned tasks during flight. The standard flight path for the UAV is designed such that the origination point and the destination point are the same place.

The current state of the art is limited though. The use of a UAV is limited to the geographic range of half of its battery power. When a UAV begins its flight and flies straight from its point of origin, the UAV cannot go any farther away from its point of origin when its battery power is at fifty percent. The UAV must retain the last fifty percent of its battery power for the return flight back to the point of origin. Thus, problems are presented when a UAV sustains damage and cannot complete its mission directive or a mission directive must be executed which is beyond the range of a single battery charge for a UAV.

UAVs, when operating in remote locations, require a mechanism to recharge battery powers in an autonomous manner. Systems may be developed to change batteries on the UAVs but fresh, fully charged batteries are required to supply to the UAV. This system is impractical and limited in usefulness as fully charged batteries may not be available. In addition, such a system requires a specialized UAV to be utilized.

In the current state of the art there is an assumption that a mission directive is to be executed by a single UAV. Therefore, if there are any problems or issues that develop with that UAV when it is executing its mission directive, the entire mission directive is compromised or delayed. What is needed is a system whereby a UAV may complete a partial set of tasks in a mission directive and transfer the remaining set of tasks in a mission directive to a second UAV when the first UAV is unable to do so. Furthermore, in this system of multiple UAVs, what is needed is a method of assigning an initial mission directive to an appropriately chosen UAV.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a system of UAVs and charging stations for the UAVs communicatively connected to a centralized system. The centralized system is controlled by a central server computer with a plurality of software modules. Users may interface with the server computer directly or through a client device communicatively connected to the server computer.

The invention is directed toward a method of transferring a mission directive to an unmanned vehicle comprising providing a set of instructions to a first unmanned aerial vehicle, storing the set of instructions on a nonvolatile memory component of the first unmanned aerial vehicle, executing one or more tasks of the set of instructions by the first unmanned aerial vehicle, transferring a set of instructions from the first unmanned aerial vehicle to a second unmanned aerial vehicle, and storing the set of instructions on a nonvolatile memory component of the second unmanned aerial vehicle. The set of instructions provided to the first unmanned vehicle comprise one or more tasks to be executed by the unmanned aerial vehicle. The set of instructions transferred to the second unmanned aerial vehicle comprises one or more unexecuted tasks.

The invention is also directed toward a computerized method for executing a flight mission by one or more unmanned aerial vehicles comprising, on a computer system comprising one or more microprocessors and one or more nonvolatile memory units, the one or more nonvolatile memory units storing instructions which when executed by the one or more microprocessors cause the computer system to perform operations comprising receiving a geographic starting point for a mission to be executed by an unmanned aerial vehicle, receiving a geographic end point for a mission to be executed by an unmanned aerial vehicle, calculating a geographic flight path for one or more one or more unmanned aerial vehicles, receiving a preferred distance from the flight path, and calculating the geographic position of one or more unmanned aerial vehicles within the preferred distance from the flight path. The flight path includes the geographic starting point and the geographic end point.

The method may further comprise generating a list of one or more unmanned aerial vehicles within the preferred distance of the flight path. The method may further comprise receiving a set of mission objectives, calculating the energy needs of one or more unmanned aerial vehicles on the generated list to execute flight along the flight path, and calculating the energy needs of one or more unmanned aerial vehicles on the generated list to execute mission objectives along the flight path. The method may further comprise selecting one or more unmanned aerial vehicles from the generated list. The method may further comprise measuring the battery power level of one or more selected unmanned aerial vehicles. The method may further comprise assigning mission to one or more selected unmanned aerial vehicle.

The method may further comprise transferring a set of instructions from a first unmanned aerial vehicle to a charging station, storing the set of instructions on a nonvolatile memory component of the charging station, transferring the set of instructions from the charging station to a second unmanned aerial vehicle, and storing the set of instructions on a nonvolatile memory component of the second unmanned aerial vehicle. The set of instructions comprise one or more unexecuted tasks. In another embodiment the method may further comprise receiving a low power notification from a first unmanned aerial vehicle, calculating the inflight geographic position of the first unmanned aerial vehicle, calculating the remaining flight distance of the first unmanned aerial vehicle, calculating the geographic position of one or more charging stations within the remaining flight distance, selecting a charging station within the remaining flight distance, transferring a set of instructions to the first unmanned aerial vehicle, and directing the first unmanned aerial vehicle to the selected charging station. The set of instructions comprise an override command and a redirect command. The override command directs the first unmanned aerial vehicle to cease executing the mission. The redirect command directs the first unmanned aerial vehicle to fly to the selected charging station.

Furthermore, the method may further comprise transferring a set of instructions from the first unmanned aerial vehicle to the charging station, transferring the set of instructions from the charging station to a second unmanned aerial vehicle, and executing the set of instructions by the second unmanned aerial vehicle. Alternatively, the method may further comprise transferring a set of instructions to a second unmanned aerial vehicle. The set of instructions comprises one or more tasks unexecuted by the first unmanned aerial vehicle.

The invention is also directed toward a computerized method for assigning a mission directive to an unmanned aerial vehicle comprising, on a computer system comprising one or more microprocessors and one or more nonvolatile memory units, the one or more nonvolatile memory units storing instructions which when executed by the one or more microprocessors cause the computer system to perform operations comprising receiving a geographic destination point for a mission to be executed by an unmanned aerial vehicle, retrieving a list of unmanned aerial vehicles within a preferred distance to the geographic destination point, determining whether one or more unmanned aerial vehicles within the preferred distance are available, determining whether one or more unmanned aerial vehicles within the preferred distance are able to execute tasks included in the mission, calculating the energy needs for each unmanned aerial vehicle within the preferred distance that is available and has the ability to execute the mission, selecting a first unmanned aerial vehicle from the list, determining the existing battery charge of the first unmanned aerial vehicle, assigning the mission to the first unmanned aerial vehicle, and transferring a set of instructions to the first unmanned aerial vehicle to be executed by the first unmanned aerial vehicle.

The method may further comprise receiving a low power notification from the first unmanned aerial vehicle, calculating the inflight geographic position of the first unmanned aerial vehicle, calculating the remaining flight distance of the first unmanned aerial vehicle, calculating the geographic position of one or more charging stations within the remaining flight distance, selecting a charging station within the remaining flight distance, transferring a set of instructions to the first unmanned aerial vehicle, and directing the first unmanned aerial vehicle to the selected charging station. The set of instructions comprise an override command and a redirect command. The override command directs the first unmanned aerial vehicle to cease executing the mission. The redirect command directs the first unmanned aerial vehicle to fly to the selected charging station. The method may further comprise transferring a set of instructions from the first unmanned aerial vehicle to the charging station, transferring the set of instructions from the charging station to a second unmanned aerial vehicle, and executing the set of instructions by the second unmanned aerial vehicle. The method may further comprise transferring a set of instructions to a second unmanned aerial vehicle where the set of instructions comprises one or more tasks unexecuted by the first unmanned aerial vehicle.

The method may further comprise transferring a set of instructions from the first unmanned aerial vehicle to a charging station, transferring the set of instructions from the charging station to a second unmanned aerial vehicle, and executing the set of instructions by the second unmanned aerial vehicle. Alternatively, the method may further comprise transferring, via the first unmanned vehicle, a set of instructions to a second unmanned aerial vehicle where the set of instructions comprises one or more tasks unexecuted by the first unmanned aerial vehicle. Alternatively, the method may further comprise transferring, via a server computer, a set of instructions to a second unmanned aerial vehicle where the set of instructions comprises one or more tasks unexecuted by the first unmanned aerial vehicle.

The invention is also directed toward a system for executing missions comprising a server computer, a database, one or more charging stations, and one or more unmanned aerial vehicles. The server computer comprises a communication module, a mission module, and a flight path computation module. The database is communicatively coupled to the server computer. The one or more charging stations is communicatively coupled to the server computer. The one or more unmanned aerial vehicles are respectively communicatively coupled to one or more charging stations. The one or more unmanned aerial vehicles is communicatively coupled to the server computer. The system may further comprise one or more client computers communicatively coupled to the server computer.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

Figure 1:
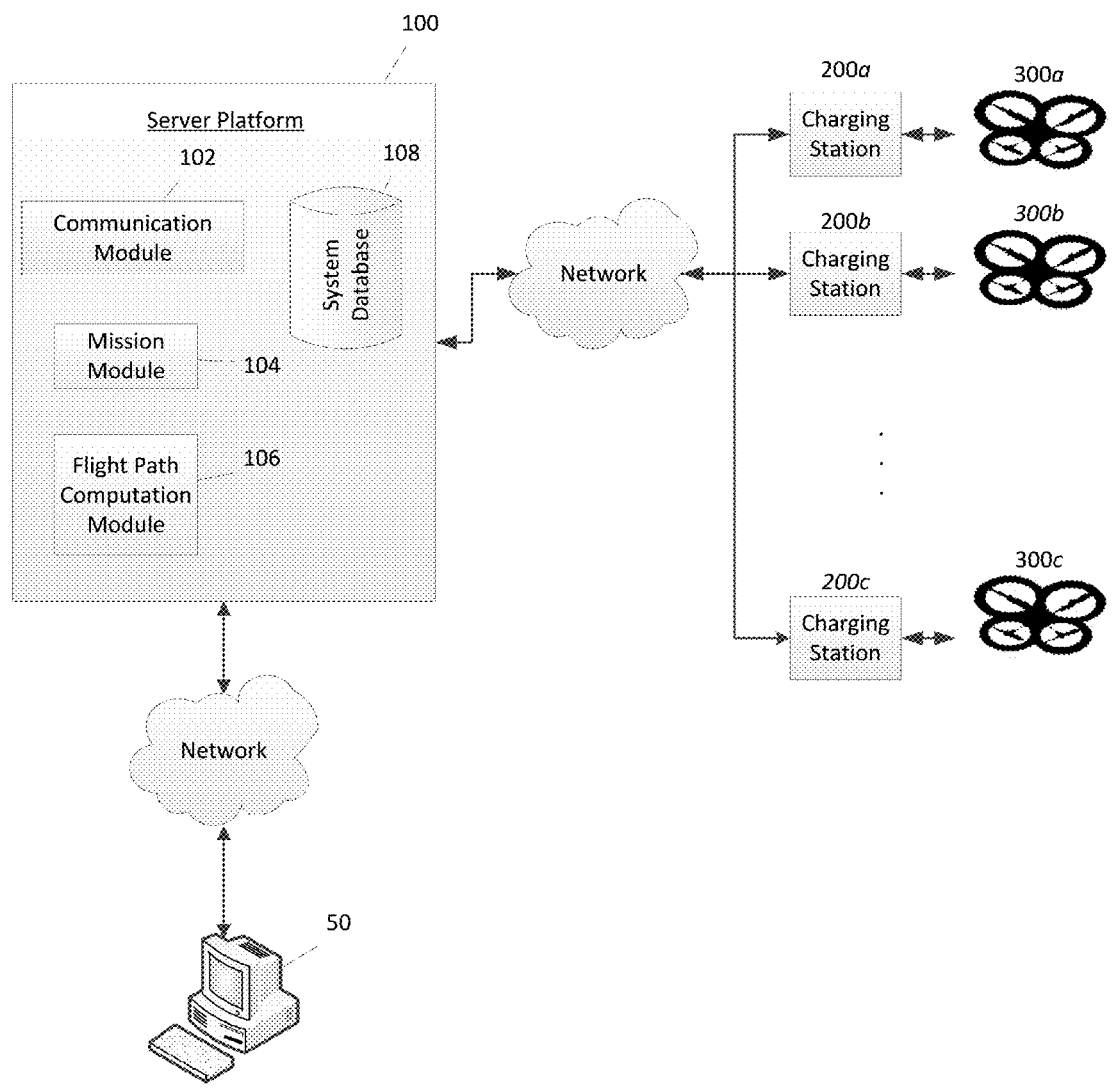
FIG. 1 is a view of the system of the invention.

The invention is directed toward a system and method for managing missions being executed by UAVs. Referring to FIG. 1, the system of the invention is displayed. The system comprises a server computer 100 connected to a plurality of charging stations 200a, 200b, 200c. Each charging station 200a, 200b, 200c is configured to receive one or more UAVs 300a, 300b, 300c. A single charging station 200 may receive a single UAV 300. In other embodiments a single charging station 200 may receive multiple UAVs 300 simultaneously. A UAV 300 may land on a charging station 200 to recharge the battery of the UAV 300. The UAV 300 may also communicate with the server computer 100 through the charging station 200. The server computer 100 can send mission details and executable instructions to the UAV 300. In other embodiments, each UAV 300a, 300b, 300c may also communicate directly with the server computer 100. The system may comprise any number of charging stations 200 and any number of UAVs 300.

The server computer 100 is communicatively coupled to a database 108. The database 108 stores all information about every UAV 300a, 300b, 300c connected to the server computer 100. The database 108 may store any relevant information pertaining to the system such as UAV location, missions being performed by each UAV, mission history, battery power levels of each UAV, and time for execution of any mission.

Users may interact with the server computer 100 directly or through a client device 50. The client device 50 may be any type of computerized device utilized by a user to communicate with the server computer 100. The client device 50 may be a desktop computer, a laptop computer, a tablet computer, a wireless cellular phone, or any other type of communicative computerized device.

The server computer 100 stores and executes a series of software modules, including a communication module 102, a mission module 104, and a flight path computation module 106. The communication module 102 determines the location of a UAV 300 and transmits instructions to be executed by a UAV 300. Each UAV 300a, 300b, 300c has a specific communication ID number which permits the communication module 102 to track and send specific instructions to each respective UAV 300a, 300b, 300c. The communication ID number can be any number assigned to each respective UAV 300a, 300b, 300c that permits the system to independently identify each each respective UAV 300a, 300b, 300c, such as a unique IP address. The communication module 102 may communicate with a UAV 300 through a charging station 200 or directly through a network connection, such as the internet or a cellular connection.

The mission module 104 computes and tracks each mission executed by each UAV 300. When a user assigns a mission to the system to be executed, the mission module 104 determines the start point and end point of the mission and which respective UAVs 300a, 300b, 300c are needed to execute the mission. The mission module 104 then determines the specific instructions to send to the respective UAVs 300a, 300b, 300c and assigns the mission to the proper UAVs 300a, 300b, 300c.

The flight path computation module 106 determines the proper flight path for each UAV 300a, 300b, 300c to maximize efficiency in time and battery life for each UAV 300a, 300b, 300c. The flight path computation module 106 determines the proper flight path from the starting point to the end point of the mission. The flight path computation module 106 determines the charging stations 200a, 200b, 200c which are along the proper flight path which may be used by the specific UAVs executing the mission.

Figure 2:
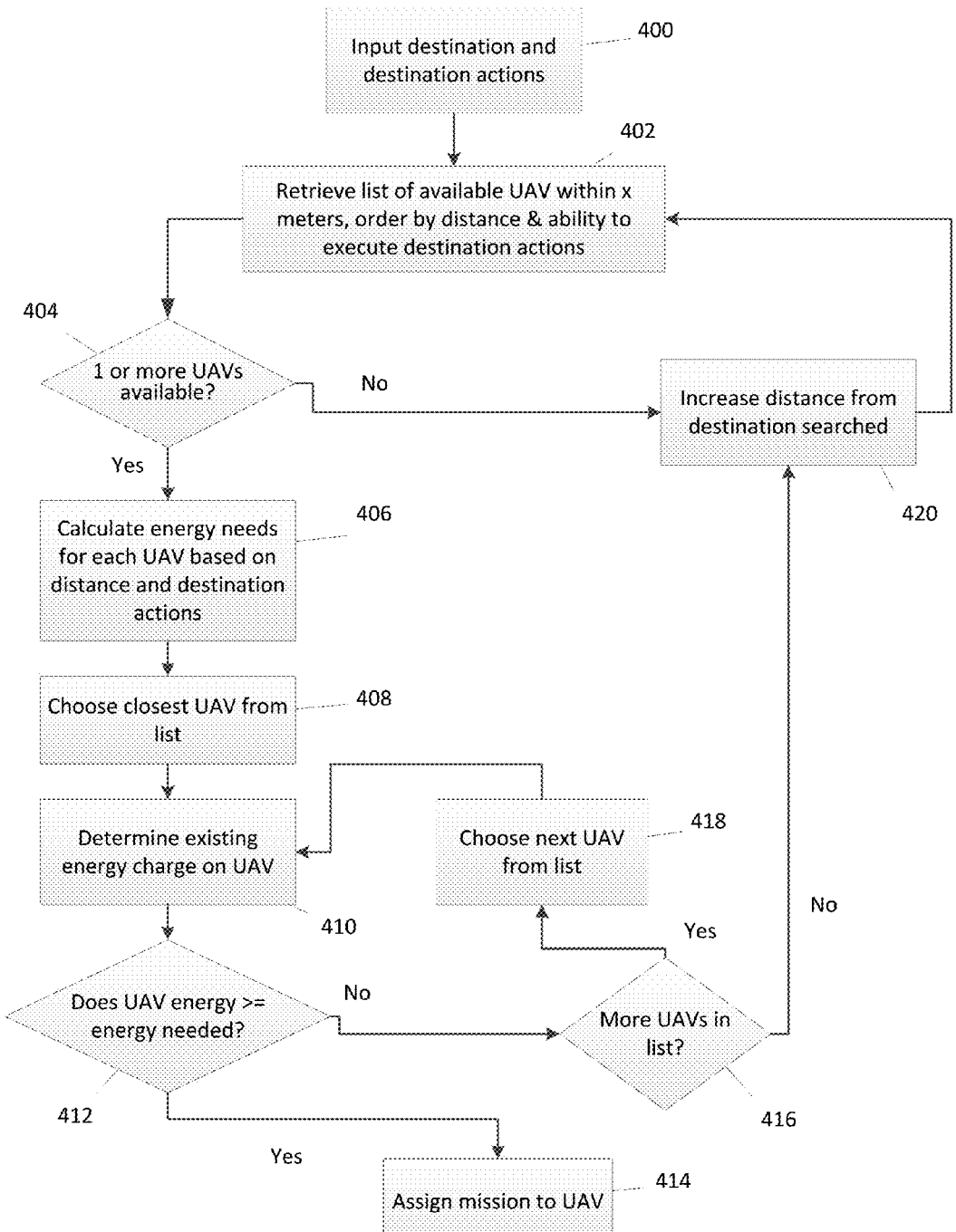
FIG. 2 is a diagram of a method of utilizing the invention.

Referring to FIG. 2, the method of utilizing the system is displayed. The system may be utilized by a user to select a UAV which is properly configured to execute the mission directive. The process starts when a user inputs a destination and one or more destination actions 400. A destination action can be any operation which can be performed by the UAV at the destination. The destination action can be delivering a package to an individual, taking a photo or video of a specific location, or any other action desired by a user which can be performed by the UAV. After the user enters the destination and the destination action, the system retrieves a list of available UAVs within x meters of the destination, orders the available UAVs by distance and ability to execute the destination actions 402. The system determines if one or more UAVs are available 404. If no UAVs are available then the system increases the distance searched for available UAVs 420. If one or more UAVs are available then the system calculates the energy needs for each UAV based on distance from the destination and the destination actions 406. The system then chooses UAV closest to the destination from the list of available UAVs 408. The system then determines the existing energy charge on the chosen UAV 410. The system determines whether the energy on the UAV is greater than or equal to the energy needed to complete the mission 412. If the chosen UAV does have a great enough battery charge to complete the mission then the system assigns the mission to the chosen UAV. If the chosen UAV does not have enough energy to complete the mission then the system determines whether there are more UAVs on the list of possible UAVs 416. If there are no more UAVs on the list of possible UAVs then the system increases the distance searched from the destination and repeats the cycle 420. If there are more UAVs on the list then the system chooses the next UAV from the list 418. The system then determines whether the next UAV has enough energy to perform the mission 410. The system repeats the process until it finds a UAV to complete the mission. If no UAV is available to be chosen even after repeating the process the system may wait until a UAV 300 that has been considered is charge by a charging station 200 sufficiently enough so that it can complete the current mission. Alternatively, the system may exhibit an alert to the user that the mission cannot be performed and seek further instructions from the user. Alternatively, in other embodiments, the system may cancel the mission altogether and alert the user about the cancellation.

Figure 3:
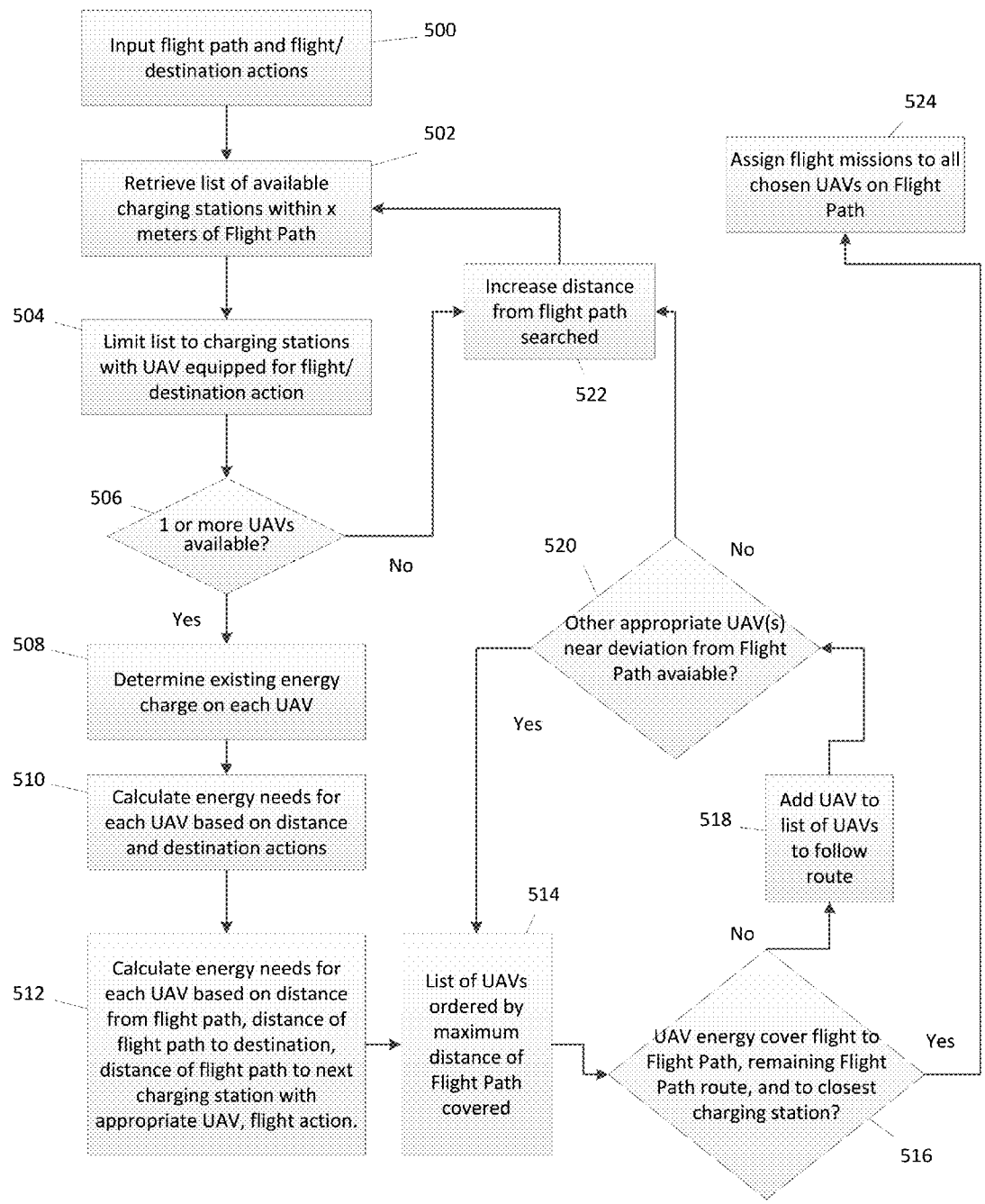
FIG. 3 is a diagram of a method of utilizing the invention.

As displayed in FIG. 3, the invention is also directed toward a system utilizing multiple UAVs 300. There may be instances when a mission is too far for only one UAV to complete the mission. This may happen if the system is used to deliver a package from a retailer to a remote location. In this circumstance, multiple UAVs will be used by the system to complete the mission in a sort of "pony express" method, where the mission is continually transferred from one UAV to another until the mission directive is complete. This method starts when a user inputs a flight path and flight or destination actions 500. The flight path and flight or destination actions may also automatically be imported from the results of the prior method displayed in FIG. 2. When the system has a confirmed flight path, it retrieves a list of charging stations within x meters of the flight path 502. The system then limits the list of charging stations to those currently having a UAV which is equipped for the flight and destination action 504. The system then determines if one or more UAVs are available at each charging station along the flight path 506. If there are not enough UAVs then the system increases the distance from the flight path and repeats the search for charging stations 522. If there are enough UAVs then the system determines the existing energy charge on each UAV 508. The system then calculates the energy needs for each UAV based on distance and destination actions 510. The system then calculates the energy needs for each UAV to be utilized based on distance of the charging station from the flight path, distance of the flight path to the destination, distance of the flight path to the next charging station, and required flight actions 512. The system then generates a list of all UAVs to be used ordered by the maximum distance of the flight path covered—so that the UAV that covers the greatest amount of the flight path is listed first 514. The system then determines whether each UAV has sufficient energy to cover the flight to the flight path, the flight over that UAV's portion of the flight path, and flight to the closest charging station 516. If there sufficient energy in each UAV the system then assigns the flight mission to all chosen UAVs on the flight path 524. If there is not sufficient energy in each UAV then the system adds an additional UAV to the list of UAVs to be utilized to follow the flight path 518. To do this the system determines if there are other appropriate UAVs near the flight path that are available 520. If there are then the system adds the UAV to the list of UAVs to be utilized and generates an order of the UAVs 514. If there are no other appropriate UAVs near the flight path the system then increases the distance from the flight path and repeats the search 522.

Figure 4:
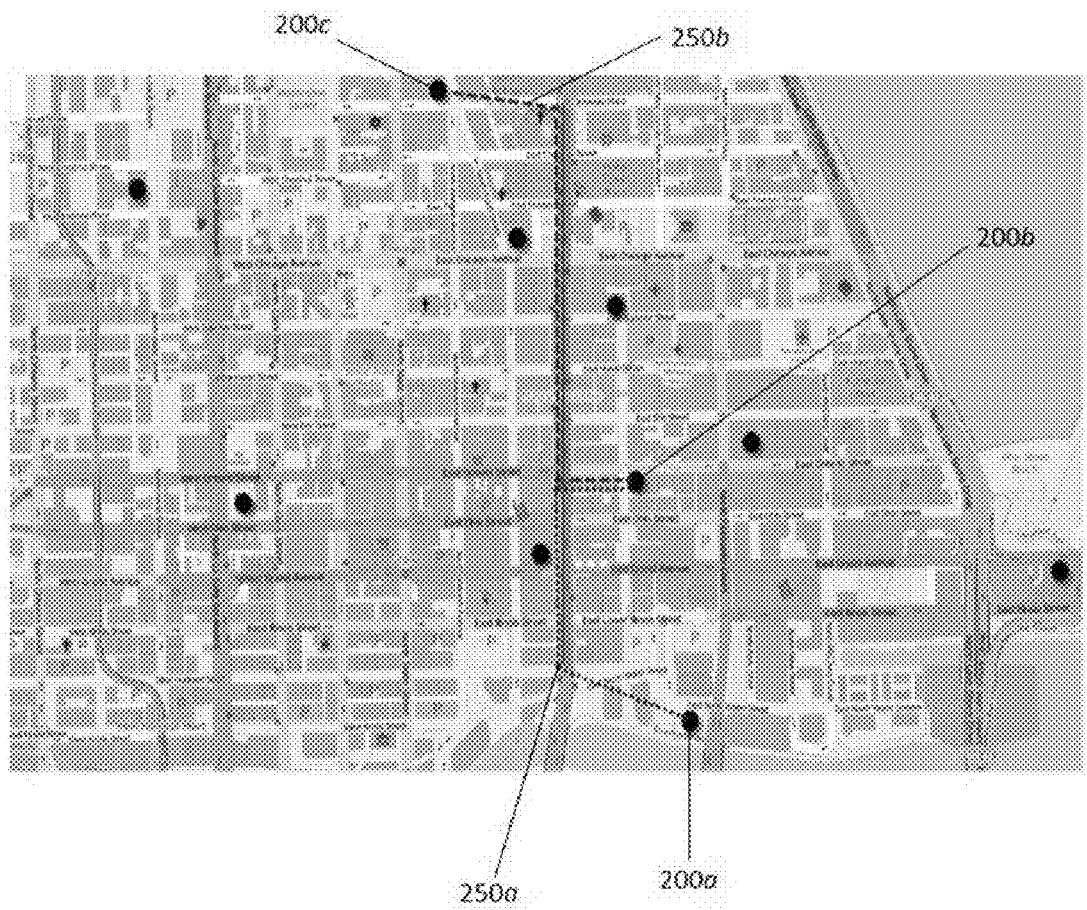
FIG. 4 is a view of a theoretical flight path.

Referring to FIG. 4, a hypothetical flight path and series of charging stations are displayed on a map. In the example displayed, a mission is executed with a starting point at a starting charging station 200a and a destination point at a destination charging station 200c. A first UAV 300 leaves the starting charging station 200a to execute the mission objectives. The first UAV 300 leaves the starting charging station 200a and follows the first leg of the flight path 250a. The system has determined that the first UAV 300 does not have sufficient power supply to fly the entire flight path and execute all mission objectives. Therefore the first UAV 300 is directed to diverge from the flight path to an intermediary charging station 200b. The first UAV 300 approaches the intermediary charging station 200b and transfers the remaining mission objectives to a second UAV 300. The second UAV 300 then departs the intermediary charging station 200b. The first UAV 300 lands on the intermediary charging station 200b so that its battery may be recharged. The second UAV 300 then follows the second leg of the flight path 250b. The second UAV 300 then ends at the destination charging station 200c. During the flight path the first UAV 300 may stop at any number of destinations or execute any number of mission objectives in between the starting charging station 200a and the intermediary charging station 200b. During the flight path the second UAV 300 may stop at any number of destinations or execute any number of mission objectives in between the intermediary charging station 200b and the ending charging station 200c. If the first UAV 300 has packages for delivery along the second leg of the flight path 250b the first UAV 300 transfers the packages to the second UAV 300 at the intermediary charging station 200b.

The transfer of the mission objectives from one UAV 300 to another UAV 300 may occur through a number of means. The transfer of mission objectives may be performed by the server computer 100. In the preferred embodiment the server computer 100 predetermines all actions for each UAV 300 utilized along the flight path and directly transfers all instructions to each respective UAV 300. In another embodiment, the first UAV 300 may notify the server computer 100 that the first UAV 300 does not have sufficient energy to complete the mission objectives. At that time the server computer 100 will determine the proper charging station 200 for the UAV 300 to proceed to. The server computer 100 will then transfer the remaining mission objectives and instructions to the second UAV 300. In another embodiment, the mission objectives and instructions stored on the first UAV 300 are directly transferred from the first UAV 300 to the second UAV 300. The direct transfer of instructions and mission objectives may also flow from the first UAV 300 to the charging station 200 and then from the charging station 200 to the second UAV 300.

Figure 5:
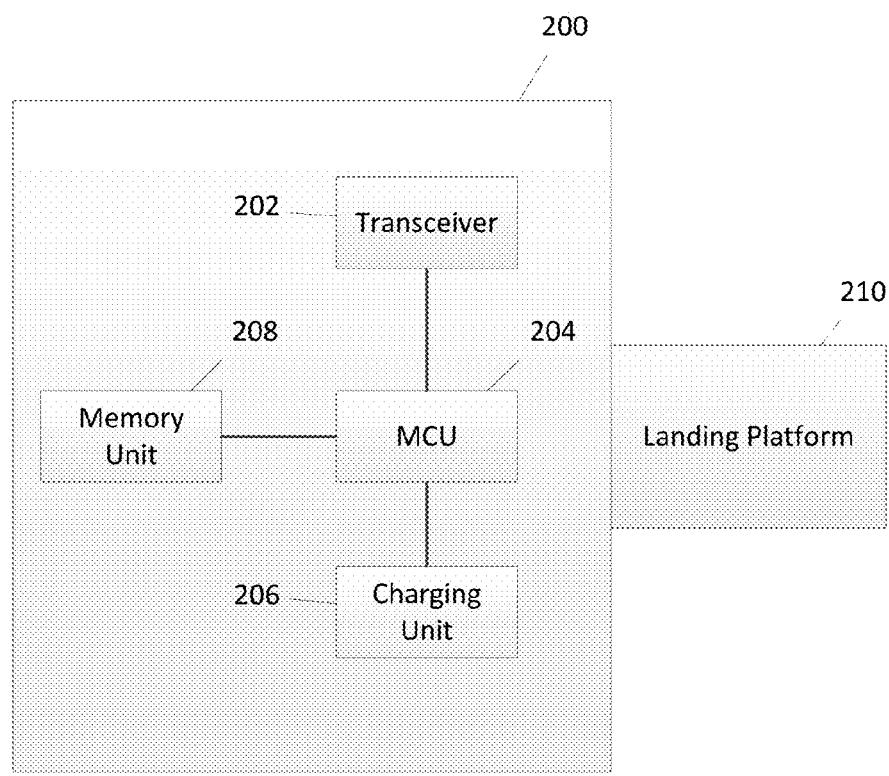
FIG. 5 is a schematic of a charging station.

The charging station 200 may be realized in any number of embodiments. Referring to FIG. 5, the preferred embodiment of the charging station 200 is displayed. In this embodiment the charging station 200 comprises a central processor 204 connected to a memory unit 208, a transceiver 202, and a charging unit 206. The central processor 204 performs all processing functions required by the charging station 200. The memory unit 208 is any type of data storage component and may store information about the UAVs currently charging at the charging station 200 or information about current missions or objectives, as well as any other relevant information. Additionally the memory unit 208 may be utilized to buffer data streams received from the server computer 100 or UAV 300. The transceiver 202 sends and receives information to and from the server computer 100 or UAV 300. In the preferred embodiment the transceiver 202 wirelessly transmits and receives information to and from the server computer 100. In other embodiments the charging station 200 may have a direct wire connection with the server computer 100 for transmitting and receiving information. In other embodiments the charging station 200 may establish a direct wired connection link with a UAV 300 that is being charged at the charging station 200. The charging unit 206 is a component utilized to recharge the battery of the UAV 300 stationed at the charging station 200. The charging unit 206 may be directly connected to the UAV 300 through a connection port, plug, or other structure to permit the flow of electricity from the charging station 200 to the UAV 300. In other embodiments the charging unit 206 may charge the UAV 300 through inductive charging without a direct connection. The charging unit 206 may be presented in a series of embodiments. In one embodiment the charging unit 206 is directly connected to an electrical grid and directly charges the UAV 300. In another embodiment, the charging unit 206 may be comprised of a battery, or a capacitor, and a power generation means, such as a solar panel. In this embodiment the charging unit 206 generates and stores electrical energy until it is needed by a UAV 300. At that point in time, the battery discharges and charges the UAV 300. The charging station also comprises a landing platform 210. The landing platform 210 provides a surface for receiving the UAV 300. The landing platform 210 may be an extension from the charging station 200. In other embodiments the landing platform 210 may be the housing of the charging station 200 itself.

Figure 6:
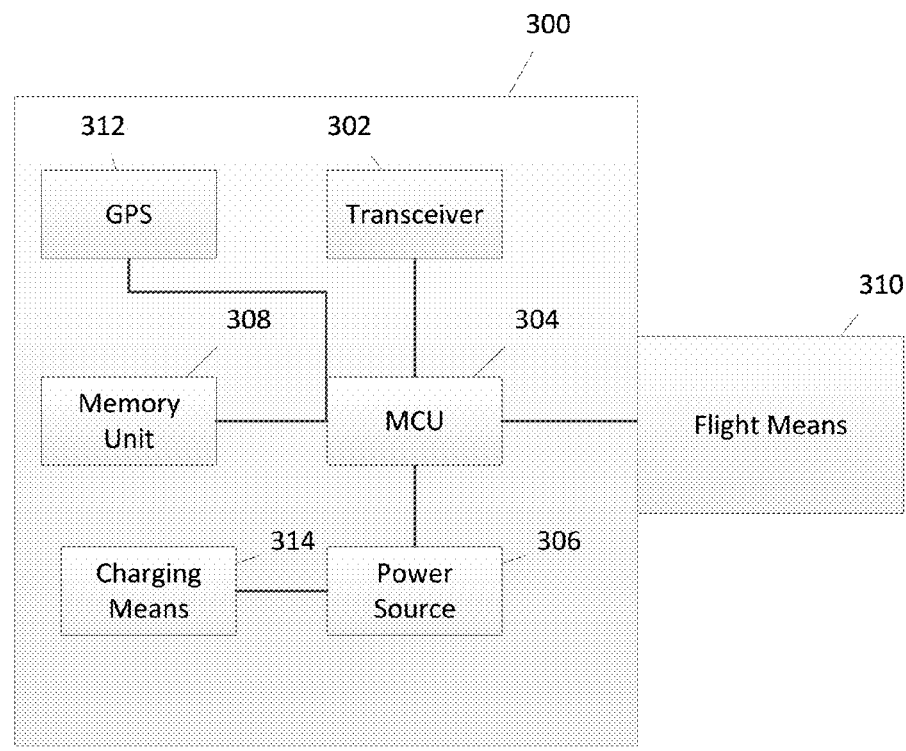
FIG. 6 is a schematic of an unmanned aerial vehicle.

Referring to FIG. 6, a standard embodiment of the UAV 300 is displayed. The UAV 300 has a central processing unit 304 which executes the instructions and missions transferred to the UAV 300. The central processing unit 304 is attached to a transceiver 302, a memory unit 308, a power source 306, a GPS unit 312, a charging means 314, and a flight means 310. The memory unit 308 is any type of data storage component and may store information about the about current missions or objectives being executed by the UAV 300, the location of the nearest charging station 200, as well as any other relevant information. Additionally the memory unit 308 may be utilized to buffer data streams received from the server computer 100 or charging station 200. The transceiver 302 sends and receives information to and from the server computer 100 or charging station 200. In other embodiments the transceiver 302 may send and receive information through a wireless cellular network. The system may transmit mission data through the wireless cellular network. The information received in the transceiver 308 from the wireless cellular network may also permit the UAV 300 to triangulate its position based on signals received from cellular phone towers. The GPS unit 312 determines the global position of the UAV 300. The GPS unit 312 permits the server computer 100 to determine the location of the UAV 300 before and during its flight path to calculate the most efficient flight path or variations of the flight path. The power source 306 may be any type of battery configured to meet the energy needs of the UAV 300 to ensure power for flight of the UAV 300 and operation of the central processing unit 306, the transceiver 302, the memory unit 308, and the GPS unit 312. The charging means 314 is any component or circuitry configured to receive energy from the charging unit 206 of the charging station 200 to resupply energy to the power source 306.

The flight means 310 of the UAV 300 is any type of motorized component or multiple components configured to generate sufficient lift to get the UAV 300 into flight. The flight means 310 may comprise one or more horizontal propellers. In other embodiments, the flight means 310 may comprise one or more set of wings and a vertical propeller. In other embodiments the flight means 310 may comprise one or more set of wings and a combustible jet engine.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A computerized method for executing a flight mission by one or more unmanned aerial vehicles to be performed on a computer system comprising two or more microprocessors and two or more nonvolatile memory units, wherein at least one of said two or more microprocessors and one of said two or more nonvolatile memory units is integral to an unmanned aerial vehicle further comprising a flight means, said two or more nonvolatile memory units storing instructions which, when executed by said two or more microprocessors, cause said computer system to perform operations comprising:
 receiving, by said computer system, a geographic starting point for a mission to be executed sequentially by at least a first unmanned aerial vehicle and a second unmanned aerial vehicle;
 receiving, by said computer system, a geographic end point for said mission to be executed by at least said first unmanned aerial vehicle and said second unmanned aerial vehicle;
 calculating, by said computer system, a single geographic flight path for at least said first unmanned aerial vehicle and said second unmanned aerial vehicle
  wherein said single geographic flight path includes said geographic starting point, said geographic end point, and one or more intermediary charging stations respectively containing one or more unmanned aerial vehicles;
  wherein said first unmanned aerial vehicle is assigned a first leg of said single geographic flight path;
  wherein said second unmanned aerial vehicle is assigned a second leg of said single geographic flight path;
 receiving, by said computer system, a preferred distance from said single geographic flight path;
 calculating, by said computer system, a geographic position of at least said first unmanned aerial vehicle and said second unmanned aerial vehicle within said preferred distance from said single geographic flight path;
 assigning, by said computer system, said mission to said first unmanned aerial vehicle and said second unmanned aerial vehicle prior to the execution of said mission by said first unmanned aerial vehicle and said second unmanned aerial vehicle, wherein said first unmanned aerial vehicle and said second unmanned aerial vehicle are selected from among a plurality of unmanned aerial vehicles located within said preferred distance from said single geographic flight path; and
 wherein said second unmanned aerial vehicle is stationed at an intermediary charging station.

2. The method as in claim 1 further comprising
 generating, by said computer system, a list of one or more unmanned aerial vehicles stationed at an intermediary charging station within said preferred distance of said single geographic flight path.

3. The method as in claim 2 further comprising
 receiving, by said computer system, a set of mission objectives;
 calculating, by said computer system, an energy requirement to execute flight along said single geographic flight path of each of one or more unmanned aerial vehicles on said generated list;
 calculating, by said computer system, an energy requirement to execute mission objectives along said single geographic flight path of each of one or more unmanned aerial vehicles on said generated list.

4. The method as in claim 3 further comprising
 selecting, by said computer system, said first unmanned aerial vehicle and said second unmanned aerial vehicle from said generated list.

5. The method as in claim 4 further comprising
 measuring, by said computer system, a battery power level of said first unmanned aerial vehicle and a battery power level of said second unmanned aerial vehicle.

6. The method as in claim 5 further comprising
 transferring a set of instructions from said first unmanned aerial vehicle to a charging station
  wherein said set of instructions comprises one or more unexecuted tasks;
 storing, by said computer system, said set of instructions on a nonvolatile memory component of said charging station;
 transferring, by said computer system, said set of instructions from said charging station to said second unmanned aerial vehicle;
 storing, by said computer system, said set of instructions on a nonvolatile memory component of said second unmanned aerial vehicle.

7. The method as in claim 5 further comprising
 receiving, by said computer system, a low power notification from said first unmanned aerial vehicle;
 calculating, by said computer system, an inflight geographic position of said first unmanned aerial vehicle;
 calculating, by said computer system, a remaining flight distance of said first unmanned aerial vehicle, wherein said remaining flight distance is determined by an amount of flight time or distance said first unmanned aerial vehicle is capable of before running out of power;
 calculating, by said computer system, a geographic position of one or more charging stations within said remaining flight distance;
 selecting, by said computer system, a charging station within said remaining flight distance;
 transferring, by said computer system, a set of instructions to said first unmanned aerial vehicle
  wherein said set of instructions comprise an override command and a redirect command;
  wherein said override command directs said first unmanned aerial vehicle to cease executing said mission;
  wherein said redirect command directs said first unmanned aerial vehicle to fly to said selected charging station;
 directing, by said computer system, said first unmanned aerial vehicle to said selected charging station.

8. The method as in claim 7 further comprising
 transferring, by said computer system, a set of instructions from said first unmanned aerial vehicle to said charging station;
 transferring, by said computer system, said set of instructions from said charging station to a third unmanned aerial vehicle;
 executing, by said computer system, said set of instructions by said third unmanned aerial vehicle.

9. The method as in claim 7 further comprising
transferring, by said computer system, a set of instructions to a third unmanned aerial vehicle
wherein said set of instructions comprises one or more tasks unexecuted by said first unmanned aerial vehicle.

10. The method as in claim 1 further comprising
assigning, by said computer system, said mission to a third unmanned aerial vehicle prior to the execution of said mission by said first unmanned aerial vehicle, said second unmanned aerial vehicle, and said third unmanned aerial vehicle;
wherein said third unmanned aerial vehicle is assigned a third leg of said single geographic flight path;
wherein said third unmanned aerial vehicle is stationed at a second intermediary charging station.

11. The method as in claim 10 further comprising
assigning, by said computer system, said mission to a fourth unmanned aerial vehicle prior to the execution of said mission by said first unmanned aerial vehicle, second unmanned aerial vehicle, said third unmanned aerial vehicle, and said fourth unmanned aerial vehicle;
wherein said fourth unmanned aerial vehicle is assigned a fourth leg of said single geographic flight path;
wherein said fourth unmanned aerial vehicle is stationed at a third intermediary charging station.

* * * * *